United States Patent
Matsui et al.

[11] 3,771,033
[45] Nov. 6, 1973

[54] APPARATUS FOR PROPELLING A MOVABLE BODY IN A SUSPENDED STATE AT A VERY HIGH SPEED

[75] Inventors: Kazumi Matsui; Takashi Umemori, both of Tokyo, Japan

[73] Assignee: Japanese National Railways

[22] Filed: July 6, 1971

[21] Appl. No.: 159,852

[30] Foreign Application Priority Data
July 7, 1970 Japan............................... 45/58720
Sept. 25, 1970 Japan............................... 45/83420
Sept. 25, 1970 Japan............................... 45/83421

[52] U.S. Cl.................... 318/135, 310/13, 104/148
[51] Int. Cl. ............................................ H02k 41/02
[58] Field of Search ................................ 310/12–14; 318/121, 135; 104/148, 148 LM, 148 MS; 308/10

[56] References Cited
UNITED STATES PATENTS

| | | | |
|---|---|---|---|
| 3,638,093 | 1/1972 | Ross.................... | 310/12 X |
| 714,851 | 12/1902 | Albertson ............ | 310/13 X |
| 1,020,942 | 3/1912 | Bachelet .............. | 310/13 X |
| 1,020,943 | 3/1912 | Bachelet .............. | 310/13 |
| 1,090,213 | 3/1914 | Johnson ............... | 310/13 X |
| 1,123,306 | 1/1915 | Johnson ............... | 310/13 |
| 3,407,749 | 10/1968 | Frig..................... | 318/135 X |
| 3,456,136 | 7/1969 | Pierro .................. | 310/12 |
| 3,575,650 | 4/1971 | Fengler................ | 318/135 |
| 2,870,349 | 1/1959 | Rosenberg et al..... | 310/13 |
| 3,589,300 | 6/1971 | Wipf..................... | 104/148 |
| 3,225,228 | 12/1965 | Roshala ................ | 310/12 |

Primary Examiner—D. F. Duggan
Attorney—James E. Armstrong et al.

[57] ABSTRACT

The present invention has to do with a method for propelling a movable body suspended along a set path at a very high speed. Along the path of the movable body, fixed armature windings consisting of rectangular current loops are continuously arranged adjacent to one another in vertical direction to the ground. Power supply mechanisms to supply d-c successively to the movable body as it moves on are provided on said fixed armature windings. The movable body is mounted on a movable magnetic field. The movable magnetic field is generated by a permanent magnet or an electromagnet which produces a magnetic flux cutting across the conductors of the fixed armature windings, which is perpendicular to the current loop of the fixed armature windings, said conductors being perpendicular and parallel to the ground. A relative lift is created between the conductor, parallel to the ground, of the fixed armature winding and the movable magnetic field, while at the same time a relative drive is created between the conductor, perpendicular to the ground, of the fixed armature winding and the movable magnetic field, thereby the movable body can be propelled in a suspended state.

16 Claims, 17 Drawing Figures

APPARATUS FOR PROPELLING A MOVABLE BODY IN A SUSPENDED STATE AT A VERY HIGH SPEED

BACKGROUND OF THE INVENTION

The present invention relates to a method for propelling a movable body in a suspended state along a set path at a very high speed, particularly to a method for propelling a movable body suspendedly mounted on a movable magnetic field which is generated by the arrangement of fixed armature windings composed of a plurality of continuous fixed rectangular loops vertical to the ground; power supply mechanisms which supply d-c to said fixed armature windings as the movable body moves on; and a permanent magnet or an electromagnet which cuts the conductor, perpendicular to the ground, and the conductor, parallel to the ground, of said fixed armature windings, with a magnetic flux vertical to the current loop.

The conventional railway vehicle comprises a truck equipped underneath with a plurality of wheels for rolling contact with rails. The vehicle is driven by a torque given to the wheels from a motor along rails. Operation of this vehicle at a speed as high as 400-500 Km/h in this conventional manner, would be impossible because of the increased vibration of the truck and the reduced adhesion between rail and wheels.

To overcome this difficulty, a linear motor on a-c or jet propulsion has been proposed for driving the vehicle. It has been revealed, however, that the proposed a-c linear motor lacks the power factor and the efficiency sufficient for operation at a speed as high as 400-500 Km/h; and the study is still under way to find a method that can give an a-c linear motor having a sufficient power factor and efficiency. Meanwhile, the proposed jet propulsion has a drawback of producing a great noise in driving the vehicle. This fact alone disqualifies its adoption in urban areas.

Moreover, both proposals are controversial with respect to the load bearing. Namely, they involve many unsolved factors such as heavy wear of wheels under operation at such a high speed, the wheel resistance and the noise. Thus, magnetic suspension and air cushion methods lave come to be advocated, in which the vehicle, free from the controversial wheels with respect to the load bearing, can be run in a suspended state. The magnetic suspension system so far proposed is one in which the vehicle is suspended by the repulsive force of a permanent magent or an electromagnetic, but this system is not able to give sufficient lift and moreover it needs tremendous investments in ground installations. As for the air cushion system, it is noisy and hard to apply for a multi-unit train. Thus, the idea of combining a linear motor or jet propulsion with magnetic suspension or air cushion for the purpose of driving the vehicle in a suspended state has a doubious future.

In view of the disadvantages of these systems, the primary object of the present invention is to provide an improved system of suspended propulsion of a movable body at a very high speed, which is free from such disadvantages.

Another object of the present invention is to provide a method of high speed vehicle operation which is characterized by both lift and drive being given simultaneously from a single simplified device instead of separate devices; the suspended height of the vehicle being maintained constant during the operation; and the necessary drive being produced without use of any large installation.

A third object of this invention is to provide a method of high speed vehicle operation in which the fluctuations of drive and lift given to the vehicle are minimal and the supply of d-c to the vehicle takes place smoothly during the operation at a very high speed.

In the present invention, fixed armature windings are continuously arranged adjacent to one another along the path on the ground. The current loops of these windings are perpendicular to the ground and stationary. Power supply mechanisms for supplying d-c successively to these windings as the movable body proceeds are installed. The movable body is equipped underneath with a movable magnetic field constituted by a permanent magent or an electromagnet. The movable magnetic field is attached to the movable body in such position that its magnetic flux may be perpendicular to the current loop of said fixed armature winding and may cut across the conductors of said windings which are perpendicular or parallel to the ground.

When the magnetic flux of said movable field cuts across the conductors, perpendicular or parallel to the ground, of said fixed armature winding, drive and lift are created to propel the movable body equipped with the movable field in a suspended state.

Other objects and features of the present invention will be made clear by reading the following description together with the accompanying drawings.

BRIEF DESCRIPTION OF THE DRAWINGS

FIGS. 6(a) through 11 illustrate embodiments of this invention, FIG. 6(a) being an oblique view of a partially cutaway mechanism, FIG. 6(b) a front elevation view of FIG. 6(a) as seen from the moving direction.

FIGS. 12 and 13 are graphs illustrating the results of experiments carried out in relation to the present invention.

Referring to FIGS. 1 through 5, the basic composition for suspended propulsion of a movable body according to the present invention is described.

In FIG. 1, 1-1 to 1-6 are rectangular fixed armature windings whose adjacently positioned current loops are perpendicular to the ground. Loops 1-3 to 1-5 pass the current from the d-c sources 3-3- to 3-5 respectively. Movable magnetic fields composed of an electromagnet or a permanent magent, are disposed with their ends opposite to each other at definite spacing. The current loops of the fixed armature windings 1-3 to 1-5 are fixed in parallel between these ends. Between their ends, movable fields 2 generate a magnetic flux perpendicular to the current loops of the fixed armature windings 1-3 to 1-5. The magnetic flux thus cuts across the horizontal and vertical conductors of the loops.

Figure 1:
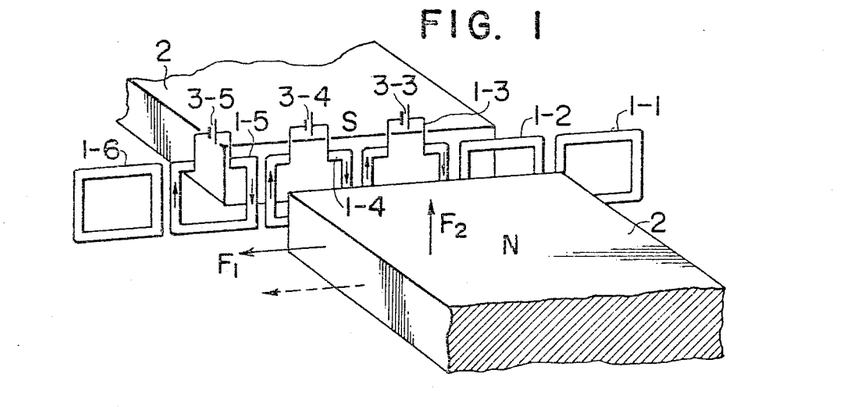
FIG. 1 is an oblique view illustrating the basic composition for suspended propulsion of a movable body according to the present invention.

Under this arrangement, suppose, for instance, that when the current flows through the fixed armature windings 1-3 to 1-5 in the arrow direction, the magnetic flux of the movable fields 2 cuts across the vertical conductors, of fixed armature windings 1-3 to 1-5. Then in accordance with the Flemings law of left hand, a horizontal drive $F_1$, occurs. On the other hand, when the magnetic flux of the movable fields 2 cuts across the horizontal conductors of fixed armature windings 1-3 to 1-5, also in accordance with the Flemings law a lift $F_2$ acting in a perpendicular direction to the ground develops. Thus, if the fixed armature windings 1-1 to 1-6 are immobilized the movable fields 2 will be lifted and driven in the dot-arrow direction; thereby the current flow direction of the fixed armature winding 1 and the magnetic flux direction of the movable field can be adequately set depending on the desired direction of lifting and driving the movable fields 2. The number of turns of the fixed armature windings is set depending on needs.

Figure 2:
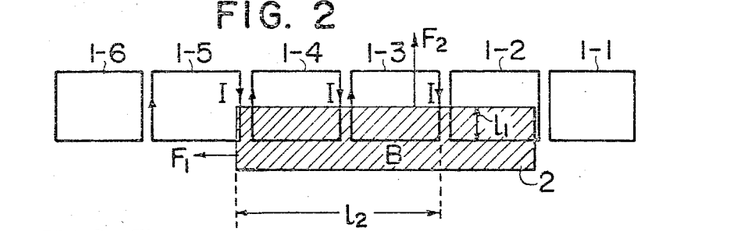
FIG. 2 is a side view illustrating the generation of drive and lift in FIG. 1.

FIG. 2 illustrates the relation between the magnetic flux of the movable fields 2 and the current loops of the fixed armature winding 1, when FIG. 1 is viewed from a direction perpendicular to the end of the movable fields. In FIG. 2, I represents the current loop and the magnitude of the current flowing through the fixed armature windings 1-3 to 1-5; and B represents the range of the movable magnetic fields 2 as well as the intensity of said fields.

If the length of the portion, which crosses the field B, of the horizontal conductor of the fixed armature windings 1-3 to 1-5 in which the current is flowing is $l_2$ and the length of the portion, which cross the field B, of the vertical conductor of the fixed armature windings 1-3 to 1-5 in which the current is flowing is $l_1$, the following drive $F_1$, will develop between the current component I and the field B;

$$F_1 = B \times l \times I \qquad (1)$$

If the fixed armature winding 1 is immobilized the drive will act to shift the movable field 2 in the horizontal direction. Meanwhile, between the current component I of the fixed armature windings 1-3 to 1-5 in the horizontal direction and the field B the following lift $F_2$ will be developed;

$$F_2 = B \times l_2 \times I \qquad (2)$$

If the fixed armature winding 1 is immobliized the lift $F_2$ will act to hold the movable field 2 upward. When the movable field is moved on pitch and the field B comes to cut across the other portion of the vertical conductor, the fixed armature windings 1-6, the drive $F_1$ will be cancelled to zero; but at this moment, if the current I of the fixed armature winding 1-3 is cut off and the current I is passed anew in the fixed armature winding 1-6, the movable field will continue to be suspended and propelled. Thus if a movable body is equipped with a movable field 2 and a power supply mechanism such that d-c supply to fixed armature windings can be switched in succession as said movable body moves on, said movable body will receive the drive and lift in continuous pulsations at the same time and will be able to run, suspended above the ground.

Figure 3:
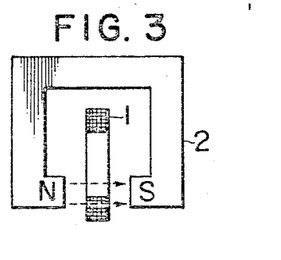
FIGS. 3 through 5 are front elevation views showing variations of the basic composition illustrated in FIG. 1.

FIG. 3 is a view of FIG. 1 as seen from the direction in which the movable fields 2 travels, N.S. being the polarity of the magnetic pole in the movable field 2.

Figure 4:
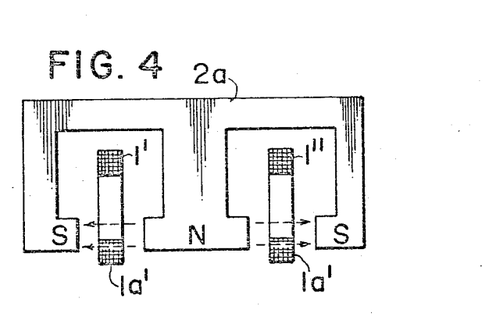
Figure 5:
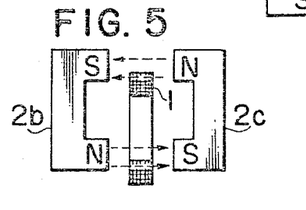

FIGS. 4 and 5 are variations of the compositions shown in FIGS. 1 and 3. In FIG. 4 the fixed armature windings 1', 1" are disposed parallel in two rows and the movable field 2a comprises an E-shaped block so that it can simultaneously cut across the fixed armature windings 1', 1". If a movable field 2a of this constitution is mounted on both sides of the bottom of the movable body, a drive and a lift will develop on both sides of said body. The net result will stabilize the tilting of the movable body around the moving axis.

FIG. 5 illustrates an example wherein the movable fields 2b, 2c of [ shape are disposed on both sides of the fixed armature winding 1 so that the magnetic flux of the movable fields may cut across the horizontal conductor of the fixed armature winding 1 at two spots. This arrangement is advantageous in that the efficiency of the fixed armature winding 1 with respect to the lift can be improved. In this case, just as in FIG. 3, the working principle is that the magnetic flux of the lower pole in the movable field 2c cuts across the longitudinal conductor of the fixed armature winding 1.

FIGS. 6 to 11 illustrates some embodiment of the present invention based on the above-mentioned basic composition.

Figure 6A:
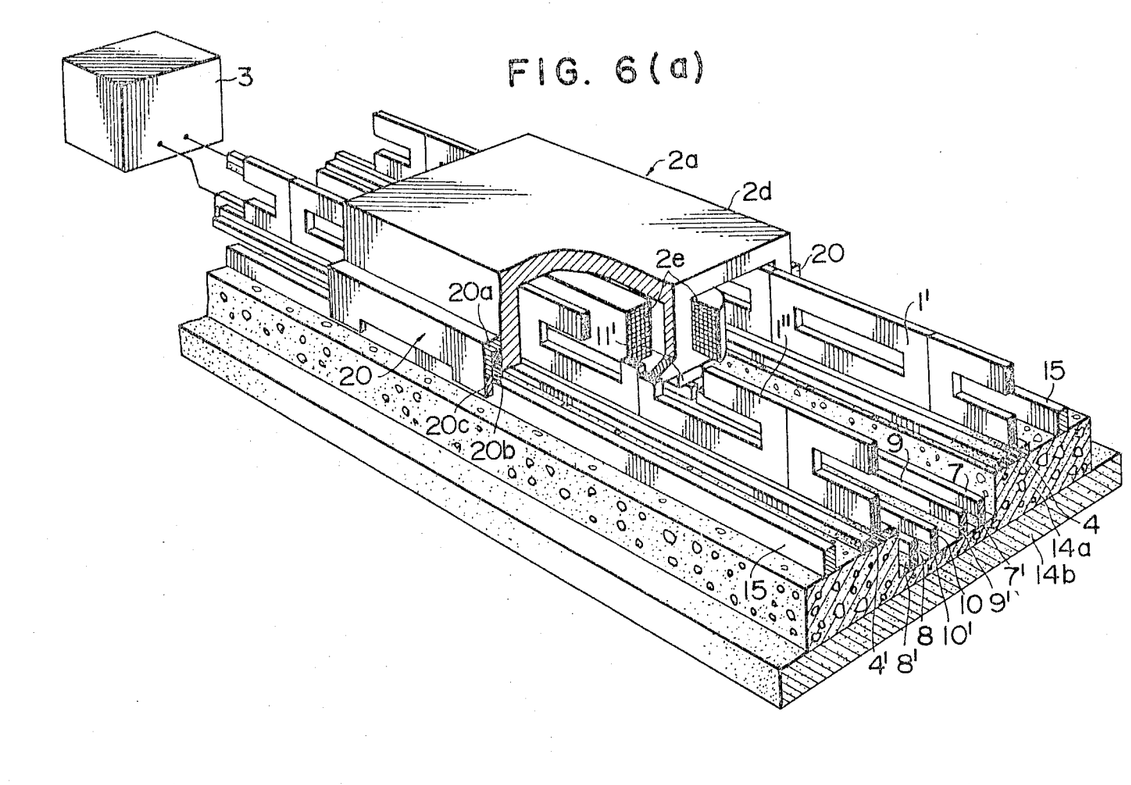
Figure 6B:
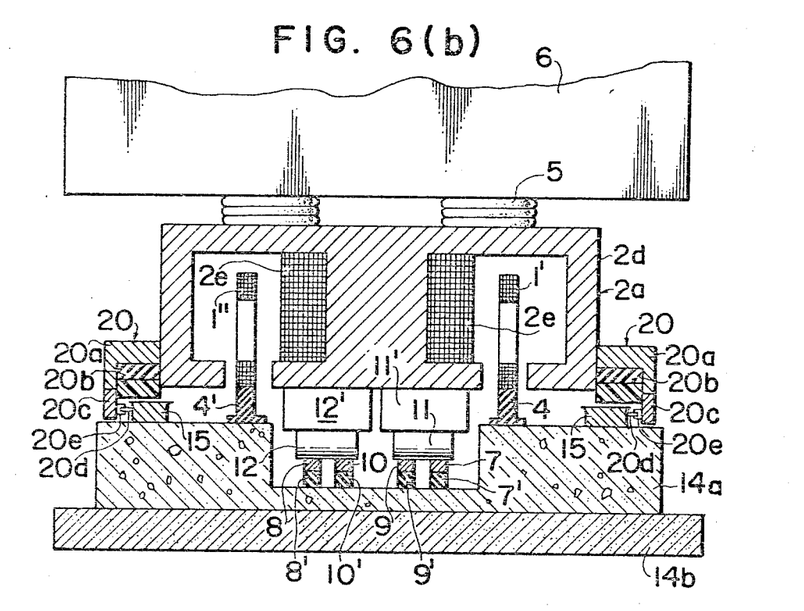
Figure 6C:
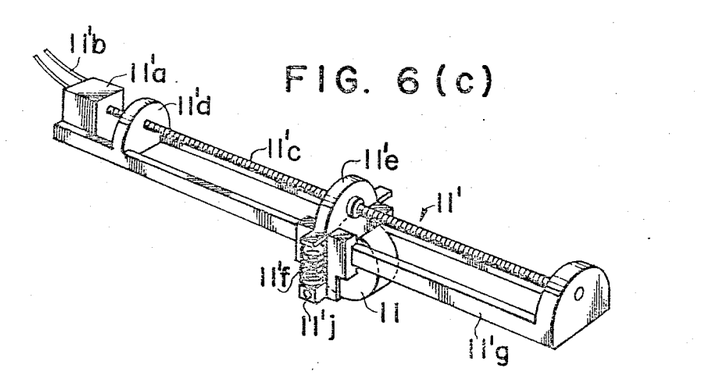
FIG. 6(c) being oblique view of the current-collecting roller of FIG. 6(a) and 6(b), FIG. 6(d) being another embodiment of FIG. 6(a) with respect to the arrangement of the current-collecting mechanisms.
Figure 7:
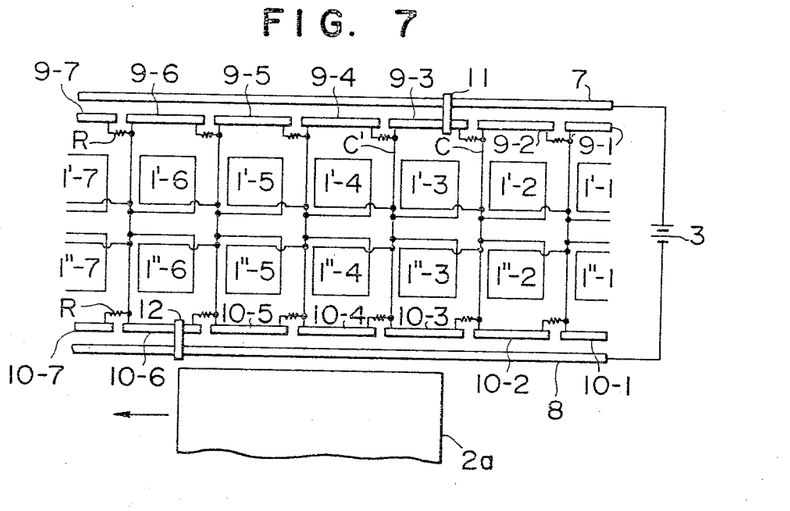
FIG. 7 is a circuit diagram illustrating the layout of the movable fields, the current-collecting rollers and the fixed armature windings in FIG. 6 and the electrical realtions of positive and negative bases, current-collecting plates and fixed armature windings.

In FIGS. 6(a) and (b), 1' and 1" are the same rectangular loops as shown in the fixed armature windings 1' and 1" of FIG. 4. A plurality of these loops are arranged in two rows with definite spacing, vertically to the ground; and fasten through insulators, 4, 4' to the concrete slab 14a. (The fixed armature windings are electrically connected only through, for instance, the connecting wires c, c' as shown in FIG. 7 so that no direct passage of current exists between adjacent fixed armature windings.) Concrete slab 14a is fastened to the ballast 14b. Movable field 2a of about the same E-shape as one shown in FIG. 4 consists of the core 2d and the coil 2e. When the coil 2e receives a current from auxiliary power supply (not shown) of main assembly 6, the core 2d is energized. As indicated in FIG. 4, the relation between the movable field 2a and the two rows of fixed armature windings 1', 1" is such that the current loops of the fixed armature windings 1', 1"

run parallel between the ends of the movable fields 2a and the magnetic flux, perpendicular to the current loops, of said movable fields 2a cuts across the vertical and horizontal conductors of the two rows of fixed armature windings. In this embodiment, the length of the movable field 2a in the travelling direction is set equal to the lengths, in the travelling direction, of three fixed armature windings 1', 1''. On the top of the movable field 2a, the main assembly 6 is mounted through, say, a known air spring 5 as illustrated in FIG. 6(b). 7 denotes the plus bus bar which is impressed with the plus voltage of the d-c supply 3 and 8 denotes the minus bus bar impressed with the minus voltage of the d-c supply 3. The plus bus bar 7 and the minus bus bar 8 are respectively fastened through insulators 7', 8' on the sides of 1' and 1'' in the central recess in the mid section of the concrete slab 14a, in parallel to the fixed armature windings 1', 1''. The current collecting plates 9 and 10 are fastened through insulators 9', 10' disposed inside and parallel to the plus bus bar 7 and the minus bus bar 8. The current-collecting plates 9 and 10 are disposed in opposition to respective fixed armature windings and the length of these plates in the travelling direction are made approximately equal to the length of respective fixed armature widnings; thereby the ends of each current-colecting plate are electrically isolated with definite separations. One end of each current-collecting plate adjoins one end of the corresponding fixed armature winding. The current-collecting rollers 11, 12 are respectively attached through the support 11', 12' to the bottom of the movable field 2a. The current-collecting rollers 11, 12 respectively turn in contact in such a condition that they can cause a short-circuit between the plus bus bar 7 and the current-collecting plate 9 and between the minus bus bar 8 and the current-collecting plate 10. Rollers 11, 12 are mounted such that there may be maintained a constant gap between them in the travelling direction. FIG. 6(c) illustrates the detailed construction of support 11'. In FIG. 6(c), 11'a is an electrical-moving mechanism, 11'b is a connecting wire, 11'c is a worm gear for movement, 11'd is a worm gear bearing, 11'e is the frame for the current-collecting roller, 11'f is a spring, 11'g is a guide for movement of the said roller, and 11 is the current-collecting roller. The spring 11'f is inserted between frame 11'e and current-collecting roller bearing 11'j to press with constant pressure the roller 11 against the plus bus bar 7 and the current-collecting plate 9. The electrical-moving mechanism 11'a, upon receiving an instruction signals from the main assembly 6 of the movable body through the connecting wire 11'b, acts to turn the worm gear 11'c supported on the worm gear bearing 11'd in the specified direction, thereby shifting the frame 11'e which hoids the roller 11 in the travelling direction. The arrangement of the support 12' is entirely the same as that of support 11'.

Figure 6D:
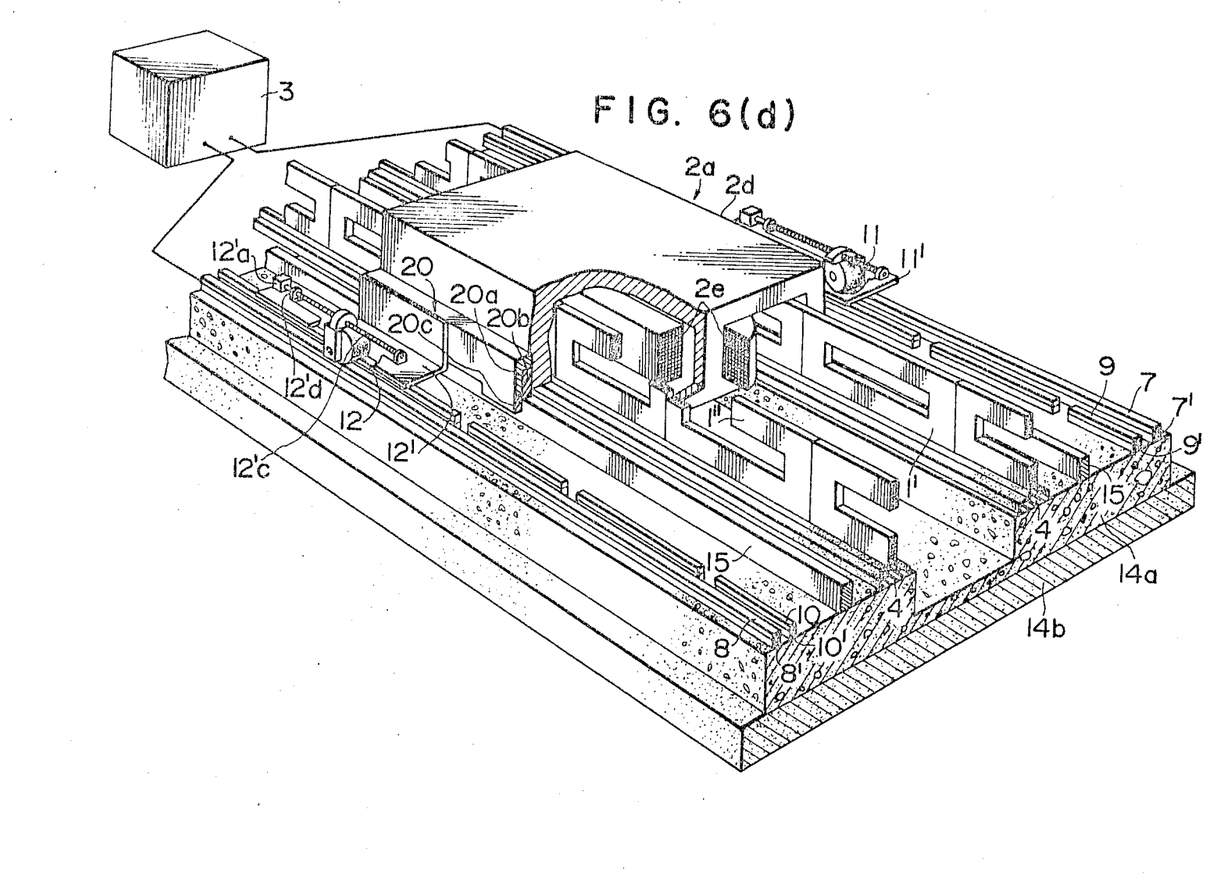

The layout of the plus and minus bus bars 7, 8 and the current-collecting plate 9, 10 is not confined to the arrangements illustrated in FIGS. 6(a) and (b); the same effect will be realized, even when they are disposed on both the outsides of the slide-rails as shown in FIG. 6(d). In the latter case, it goes without saying that the current-collecting rollers 11, 12 are located on both sides of the movable field 2a in such manner that they may turn in contact, with the effect of short-circuiting the plus and minus bus bars 7, 8 and the current-collecting plates 9.10. Moreover, 9,10. shoes mechanism 20 are installed on both sides of the movable field 2a. The slide-shoes mechanism 20 is constituted, as illustrated in FIGS. 6(a) and (b), by mounting a slider 20b on the metal frame 20a of, say, L-section. The slider 20b has the part facing the slide-rail 15 made of plastics, integrated on top with an elastic material, say rubber. The slider 20b is mounted such that its bottom may come at a lower level than the bottom of the movable field 2a. The slider 20b has preferably a rectangular section and faces the slide rail 15, fixed to both sides of the movable field 2a. When the movable assembly 6 is at rest, the slider 20b stops on the slide-rail. Under suspended propulsion of the movable assembly, it is suspended with a definite clearance above the slide-rail 15. In case of an emergency halt, it comes to a stop after sliding along the slide-rail 15 over a short distance. Further, both end portions of the metal frame 20a may be extended underward in such a manner that their inner surfaces are opposed to the outside surface of slide-rail 15 under suspended propulsion, thereby the above-extended portion 20c will act as a guide for the movable assembly 6 under suspended propulsion. On the inner side of extended portion 20c, a roller 20d may be attached through support 20e in such a manner that it may turn in contact with corresponding out-side of the slide-rail 15 when the movable field 2a is suspended-propelled. The slide-rails 15 may be disposed through insulators on the concrete-slab 14a depending on need.

Suspended propulsion of the movable field 2a under this arrangement of this invention is to be described with reference to the circuit diagram illustrated in FIG. 7.

In FIG. 7, 1'-1 to 1'-7 represent one row of fixed armature windings, as illustrated in FIG. 6 being continuously arranged; 1''-1 to 1''-7 represent the other row of similar fixed armature windings 1; 7 and 8 are the plus and minus bus bars of FIG. 6; 9-1 to 9-7 and 10-1 to 10-7 are respectively the current-collecting plates disposed on the side of the plus bus bar 7 and on the side of the minus bus bar 8; and 11, 12, 2a denote the same thing as represented by the same numbers in FIG. 6. The movable field 2a is shown here to define the relative layout of the ground installations including the rows of fixed armature windings. Among the current-collecting plates disposed respectively on the out side of the two rows of fixed armature 1'-1 to 1'-7 and 1''-1 to 1''-7 the opposite ones, for instance, 9-2 and 10-2 or 9-3 and 10-3 are electrically connected by the connecting wires c, c'. The two ends of, say, the fixed armature windings 1'-2 through 1''-3 disposed in parallel are respectively connected to said wires c, c'. By similarly connecting all the current-collecting plates respectively to the corresponding fixed armature windings electrically in succession, a ground installation, which is partially shown in FIG. 7, results 3 being the d-c supply, whereby the relative layout of the fixed armature windings and the movable fields is as illustrated in FIG. 4. Resistance R is additionally provided for preventing a spark due to the electrical switching by the current-collecting rollers 11 and 12. Under this electrical arrangement, when the movable field 2a is shifted from the position indicated in FIG. 7, for example when the current-collecting rollers 11 and 12 are respectively made to contact the current-collecting plate 9-3 and the corresponding part of the plus bus bar and the current-collecting plate 10-6 and the corresponding part of the minus bus bar; the circuit d-c supply → plus bus bar 7 → current-collecting roller 11 → current-collecting plate 9-3 → fixed armature windings 1'-4 to 1'-6 and 1''-4 to 1''-6 → current-collecting plate 10-6 → current-collecting roller 12 → minus bus bar 8 is formed to pass the current through the fixed armature windings 1'-4 to 1''-6 and 1''-4 to 1''-6. Namely the dimensions of the fixed armature winding, the travelling direction length of the movable field 2a and the gap between the current-collection roller 11, 12 are so set that the current may not flow through the fixed armature windings 1'-3 and 1''-3, but the current may flow through the fixed armature windings 1'-4, 1'-5, 1''-4, 1''-5 and the fixed armature windings 1'-6 and 1''-6 which are immediately ahead of the movable field 2a. Under this arrangement, when the current flowing in the vertical conductor of each current loop of the fixed armature windings 1'-4 to 1'-6 and 1''-4 to 1''-6 is cut across by the magnetic flux, perpendicular to the current loop, of the movable field 2a, a drive in the arrow direction is generated by the movable field 2a. At the same time, since the magnetic flux of said movable field 2a cuts across the horizontal conductors of said fixed armature windings, a lift is generated and thus the movable field is shifted in a suspended state. As the movable field 2a shifts and its tip reaches the positions of the fixed armature windings 1''-7, with the progress of the movable field 2a, the current-collecting roller 11 comes in contact with the current-collecting plate 9-4 corresponding to the fixed armature winding 1'-4 and on the plus bus bar corresponding to the current-collecting plate 9'-4, while the current-collecting roller 12 contacts the current-collecting plate 10-7 and the minus bus bar corresponding to the current-collecting plate 10-7. Thus, on the same principal as described above, the fixed armature windings 1'-5, 1'-6, 1'-7, 1''-5, 1''-6 and 1''-7 are energized to maintain the suspended propulsion of the movable field 2a in the arrow direction.

For switching the suspended propulsion of the movable field 2a at the position indicated in FIG. 7 to the coasting condition, the current-collecting roller mechanism, as shown in FIG. 6(c), is utilized to turn back the current-collecting roller 12 to the position of the current-collecting plate 10-5 and the current-collecting roller 11 to the position of the current-collecting plate 9-2 and thereby the fixed armature windings 1'-3 to 1'-5 and 1''-3 to 1''-5 are energized to prevent a drive from being developed in the presence of a lift. In this case, the current-collecting rollers 11, 12 on both sides are simultaneously shifted, with definite spacing maintained therebetween in travel direction by, for instance, the following method. Upon the instruction signal from the movable assembly 6, the current-collecting mechanism 11', 12' on both sides are worked through the connecting wire 11'b, 12'b to cause the worm gears 11'c and 12'c to rotate with the same r.p.m. in the same direction thereby shifting the current-collecting rollers 11, 12 in the same direction with a constant spacing maintained therebetween [12'b and 12'c (not shown) are respectively the connecting wire and worm gear of the current-collecting mechanisms 12' and corresponding to 11'b and 11'c respectively.] In this case if the timing for issuing the instruction signal and the r.p.m. of the worm gear 11'c 12'c are properly set, both current-collecting rollers 11, 12 can be shifted with a spacing corresponding to the timing for issuing the instruction signal.

To explain the braking of the movable field 2a under propulsion with reference also to FIG. 7, the current-collecting roller 12 is brought to the positions of the current-collecting plate 10-4 and the corresponding minus bus bar, while the current-collecting roller 11 is brought to the current-collecting plate 9-1 and the corresponding plus bus bar, thereby energizing the fixed armature windings 1'-2 to 1'-4 and 1''-2 to 1''-4 and braking the movable field 2a with a force acting in reverse direction to the previous mode of travel.

For the purpose of stopping the movable field 2a, after the above braking, the current-collecting rollers 11, 12 are shifted to the above-mentioned coasting position, just before the moment to stop it. After the movable field 2a brakes, if necessary the slide-shoes 20b in FIG. 6(b) may be made to land on the slide-rail 15 by de-energizing the movable field 2a by means of cutting off auxiliary power supply of main assembly 6 or cutting off the corresponding power supply 3. For the purpose of starting propulsion of the movable body 2a, for instance, in case of a current flowing to the corresponding fixed armature windings from the corresponding power supply 3, the core 2d is energized by switching on to flow a current to the coil 2e from auxiliary power supply of main assembly 6, thereby the movable body 2a can be suspended-propelled as described referring to FIGS. 6-9.

Figure 8A:
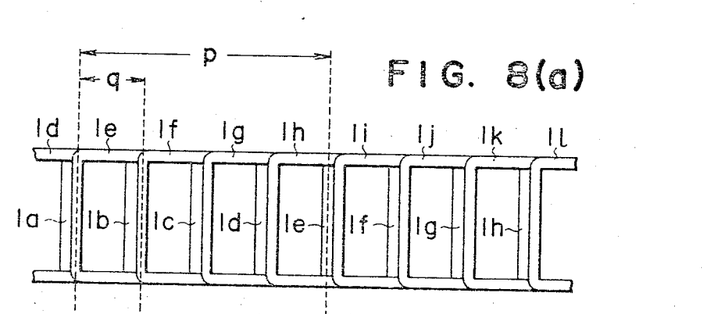
FIGS. 8(a) and (b) are respectively a side view and a plan view of another embodiment of fixed armature winding according to the present invention.
Figure 8B:
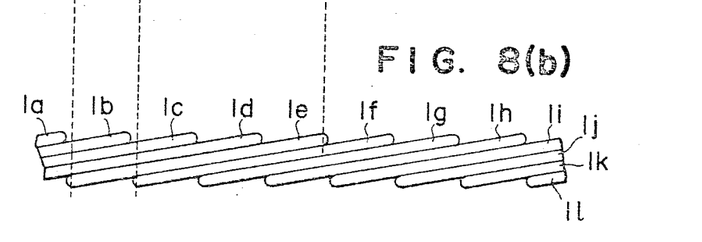

FIG. 8 illustrates another preferred embodiment of the fixed armature winding 1 to be employed in this invention. In FIGS. 8(a) and (b), 1a to 1l are independent fixed armature windings with the same composition and function as those of ones denoted by 1 in FIG. 3, P being the winding pitch and q the conductor pitch. Here the winding pitch P means the length in the travel direction of the fixed armature winding 1a to 1l respectively, while the conductor pitch q means the stagger with which the fixed armature windings 1a to 1l are overlapped in the travel direction. Thus, the fixed armature windings 1a to 1l in FIGS. 8(a) and (b) are overlapped in succession with a stagger of q, with the current loop perpendicular to the ground. Namely, the fixed armature windings with a relation of (number of separate fixed armature windings) $\times q = P$ are arranged in the same layout as 1', 1'' in FIG. 6.

Figure 9:
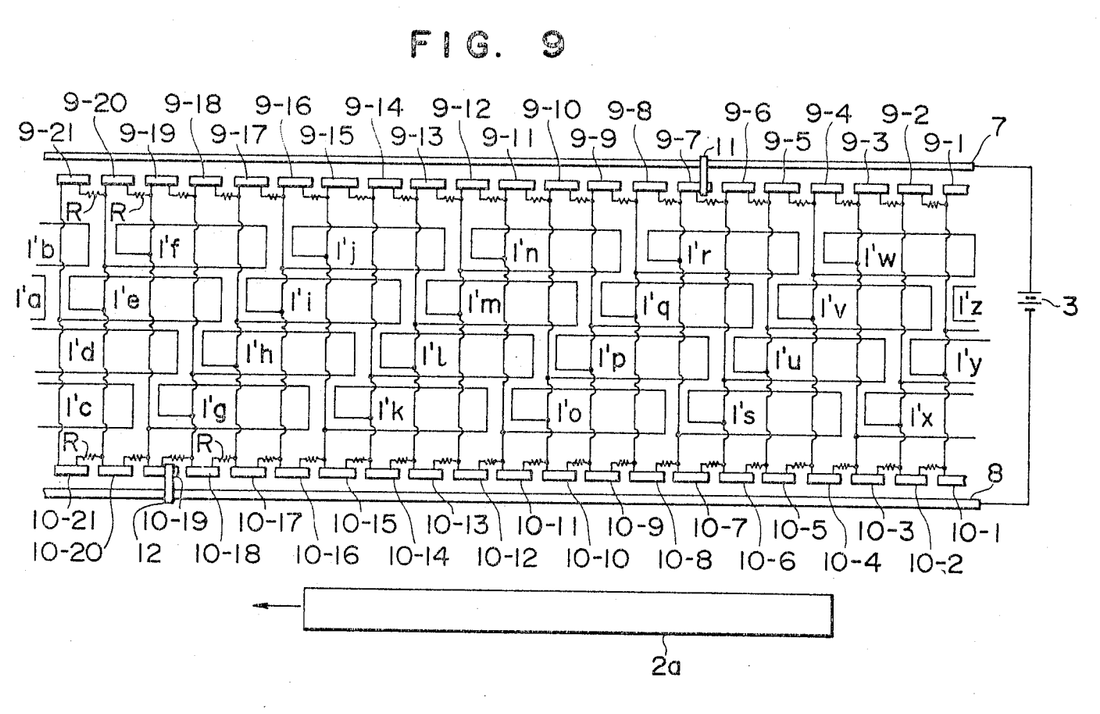
FIG. 9 is a circuit diagram illustrating the electrical relations between the movable fields, the collecting roller and the fixed armature winding when the fixed armature winding illustrated in FIGS. 8(a) and (b) is employed.

FIG. 8 illustrates a case involving four separate fixed armature windings. The number of turns in each of the fixed armature windings 1a to 1l can be varied depending on the need. FIG. 9 shows a circuit diagram illustrating the electrical connection of one of the two rows, as indicated in FIG. 6, of the fixed armature windings of FIG. 8 and the relation between these windings and the movable field 2a. In FIG. 9, a 1'a to 1'z are separated fixed armature windings and the conductor pitch P is constituted by four windings, say, 1'g to 1'h; 2a is the movable field and its length in the travel direction is represented as a length equivalent to 3 P. Also in FIG. 9, 9-1 to 9-21 correspond to the current-collecting plates 9-1 to 9-7 in FIG. 7; and 10-1 to 10-21 correspond to the plates 10-1 to 10-7; and 7, 8, 11 12 denote the same components with the same number in FIG. 7.

The two-row arrangement of fixed armature windings illustrated in FIG. 6 corresponds to the arrangement of the same components 1'a to 1'z in FIG. 9. But, for convenience of explanation, in FIG. 9 fixed armature windings are aligned in one row. Their function, however, is the same as when the fixed armature windings are disposed in two rows. Under this arrangement, when the movable field 2a is in the position as indicated in FIG. 9, the d-c is supplied through the current-collecting plates 9-7 and 10-19 to the fixed armature windings 1'g to 1'R and the movable field 2 a is lifted by the force generated in the horizontal conductors of the fixed armature windings 1'g to 1'R, while it is driven by the force generated in the vertical conductors in the trailing direction of the fixed armature windings 1'g to 1'R. Thus, the suspended propulsion in the arrow direction takes place in absolutely the same way as in FIG. 7. The only difference of this embodiment is that, the current-collecting plates 9-1 to 9-21 and 10-1 to 10-21 are provided for every conductor pitch q of the fixed armature windings. When the movable field 2a is shifted by a conductor pitch q from the position shown in FIG. 8, the current-collecting rollers 11 and 12 move to the positions of the current-collecting plates 9-8, 10-20 respectively, thereby energizing the fixed armature windings 1'f to 1'Q. With the current supply to the fixed armature winding 1'R cut off, a fresh current flows through the fixed armature winding 1'f and accordingly the suspended propulsion of the movable field 2a is maintained. Resistances R have been added to prevent sparking due to the electrical switching by the current-collecting rollers 11 and 12.

This embodiment with a split composition to the fixed armature winding has the merit that the propulsions of drive and lift occuring for every one conductor pitch shift of the movable field are small and with the inductance of the fixed armature winding reduced, the electrical switching by means of the current-collecting rollers 11, 12 is made easier.

Figure 10:
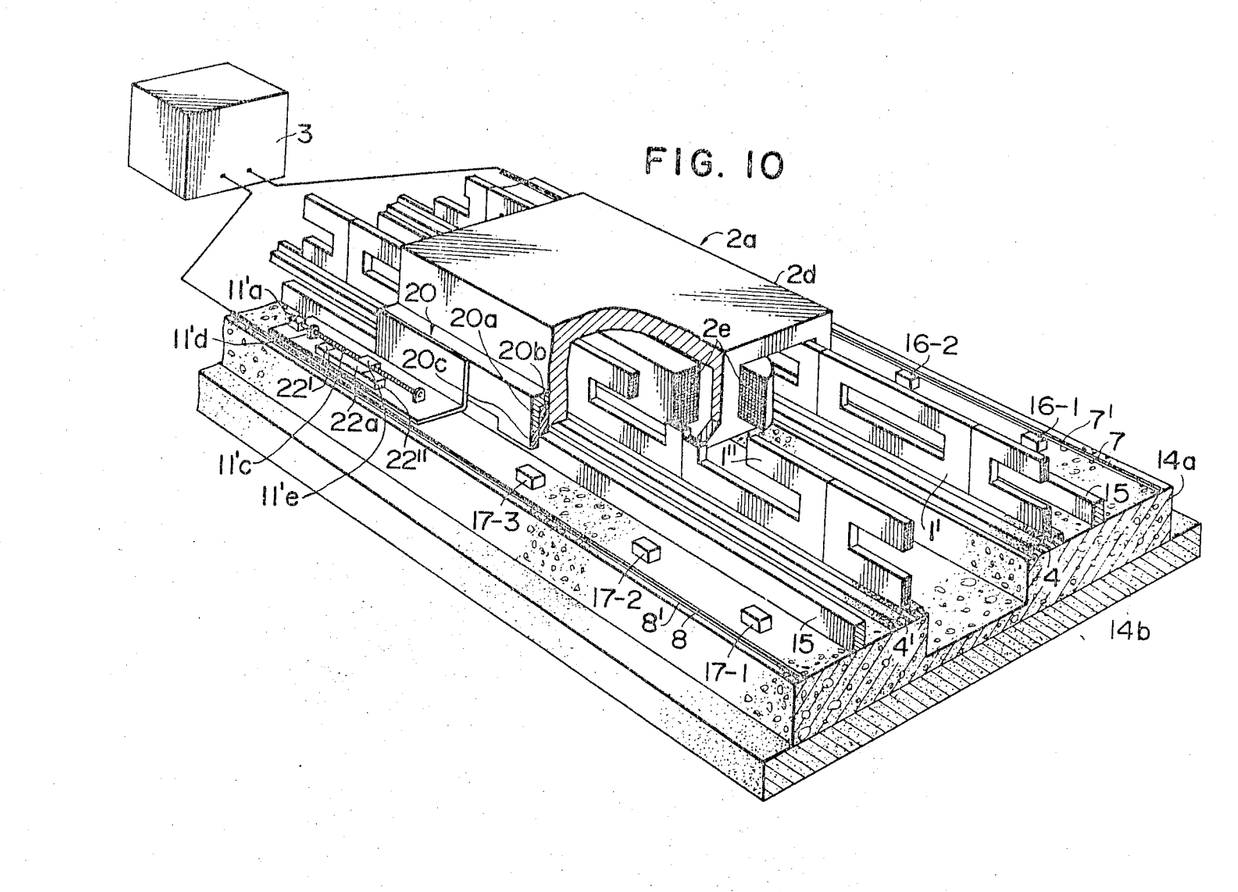
FIG. 10 is an oblique view of a partially cutaway mechanism illustrating another embodiment of the current-collection mechanism according to the present invention.
Figure 11:
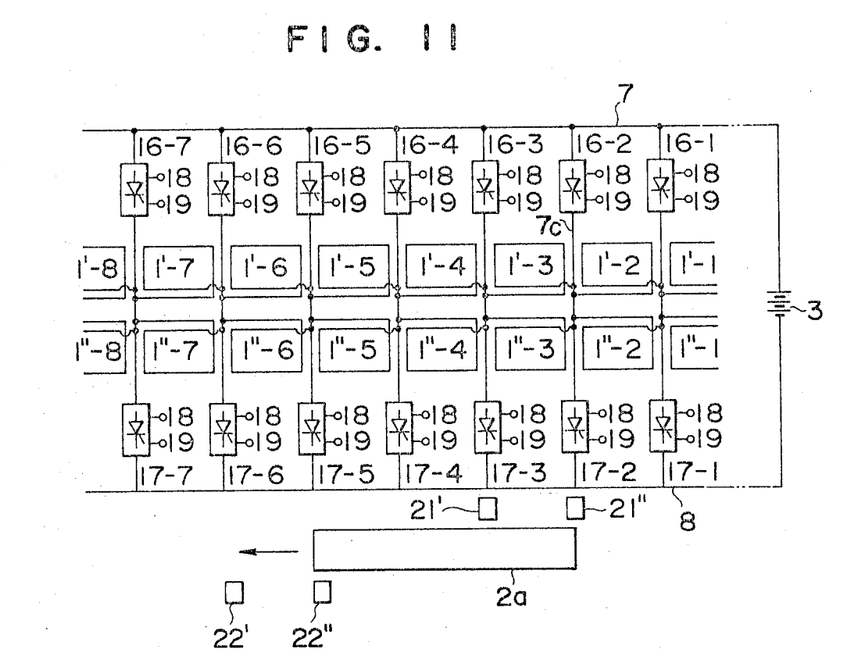
FIG. 11 is a circuit diagram illustrating the relative positions of the movable fields and the fixed armature windings in FIG. 10 and electrical connections of the positive and negative side thyristor d-c switches and the fixed armature winding.

FIGS. 10 and 11 illustrate another embodiment in which non-contacting current-collecting mechanism corresponding to the previously mentioned current-collecting rollers 11 and 12 is employed.

In FIGS. 10 and 11, 1', 1'', 2a, 2d, 2e, 3, 4, 4', 7, 8, 7', 8', 14a, 14b, 15, 20, 20a, 20b, 20c, 20d are the same components with the same numbers in FIGS. 6(a), (b) and (c). Positive-side thyristers d-c switches 16-1 to 16-7, which are fixed on the ground, opposed to and in parallel to the ends, in travel direction of the respective fixed armature windings of both rows. Each is electrically connected to the corresponding electrical connection wire, for instance, 7c between the plus bus bar 7 and the fixed armature winding 1'-2. Negative side thyrister d-c switches 17-1 to 17-7 are similarly disposed and electrically connected to the corresponding electrical connection wires between the minus bus bar 8 and the fixed armature windings. Numberals 21', 22' respectively represent the positive side and negative side ignition signal generators while 21'', 22'' are respectively the positive side and negative side extinction signal generators. The ignition signal generator 21' and extinction signal generator 21'' on the positive side are attached to the lateral surface of the movable field 2a on the side of the plus bus bar 7. Correspondingly, the ignition signal generator 22' and extinction signal generator 22'' on the negative side are attached to the lateral surface of the movable field 2a on the side of minus bus bar 8. The ignition signal generator 22' and extinction signal generator 22'' on the negative side are mechanically coupled with a definite gap through junction 22a. The same is true with similar generators on the positive side. The signal generators (consisting of ignition signal generator and extinction signal generator) on the positive side and on the negative side are shiftable back and forth in the moving direction of the movable field, with a definite spacing maintained therebetween. Accordingly, shifting may be effected by the method of FIG. 6(c). In that case, however, the signal generators on the positive side and on the negative side are respectively fastened to frame 11'e [in FIG. 6(c) ] which is shiftable in the travelling direction with the rotation of the worm gear 11'c.

The ignition input terminals 18 extinction output terminals 19 of the thyrister d-c switches on the positive side re aligned in parallel at spacings along the fixed armature windings. Both rows of input terminals are thus disposed in parallel relationship. The same relation holds between the ignition input terminal 18 and extinction input terminals 19 on the negative side. The input and output terminals 18, 19 on both sides are also disposed respectively in opposition 40 the ends, in travel direction, of the corresponding fixed armature winding; namely, input and output terminals 18, 19 are disposed in the spacings corresponding to the spacings in FIG. 6(d) where the ends, in the travelling direction, of current-collecting plates 9 (and 10) are isolated.

The ignition signal generators 21' on the positive side and 22' on the negative side are attached to the movable fields in such a manner that they oppose respectively the ignition input terminals 18 on the positive side and 18 on the negative side. The extinction signal generators on the positive and negative side are attached to the movable field 2a in such a manner that they similarly oppose the respective extinction input terminals 19 on the positive side and 19 on the negative side. Under this arrangement, for instance, light signals continuously issued from the ignition and extinction signal generators can be transmitted, with the shift of the movable fields 2a, to the corresponding ignition and extinction input terminals. Through a known photo-electric transducer (not shown), it produces an input at each terminal, thereby operating the thyrister d-c switch.

Incidentally, FIG. 10 differs from FIG. 6(a) in point of the layout of the plus and minus bus bar 7 and 8, but the same effect will be realized, even when they are disposed as shown in the FIG. 6(a). In the latter case, naturally, the positive and negative side ignition generators 21' and 22'', positive and negative thyristor d-c switches 16-1, 16-7, 17-1, 17-7 must be located to correspond to plus and minus bus bar 7 and 8.

Refering to FIG. 11, the function of the current-collecting mechanism of FIG. 10 will be described. FIG. 11 is an equivalent circuit diagram illustrating the relative position of the movable field 2a to the fixed armature windings 1'-1 to 1'-8 and 1''-1 1''-8 and the relation between the actions of the positive and negative thyristor d-c switches 16-1 to 16-7 and 17-1 to 17-7 and the fixed armature windings 1'-1 to 1'-8 and 1''-1 to 1''-8. In FIG. 11, 3,7, 8, 2a are the same components with the same numbers in FIG. 10; 1'-1 to 1'-8 and 1''-1 to 1''-8 are fixed armature windings; 16-1 to 16-8 and 17-1 to 17-7 are respectively the positive side and negative side thyristor d-c switches; 18 is the ignition signal input terminal; 19 is the extinction signal input terminal and 21', 21'', 22', 22'' are respectively the positions of the positive ignition signal generator, the positive extinction signal generator, the negative ignition signal generator and the negative extinction signal generator. When the movable field 2a, as shown in FI. 11, is in a position opposite to the fixed armature windings 1'-3 to 1'-5 and 1''-3 to 1''-5 the ignition signal generators 21' and 22' close the positive thyristor d-c switch 16-3 and the negative thyristor d-c switch 17-6, thereby forming the circuit plus bus bar 7 → thyristor d-c switch 16-3 → negative thyristor d-c switch 17-6 → minus bus bar 8 and as the result, d-c flows through the fixed armature windings 1'-4 to 1'-6 and 1''-4 to 1''-6. In this case with the fixed armature windings constituted as shown in FIG. 6 or in FIG. 9, the movable field 2a is, in the same manner as described in FIG. 6 or FIG. 9, lifted by the force generated in the horizontal conductors of the fixed armature windings 1'-4 to 1'-6 and 1''-4 to 1''-6 and driven by the force generated in their vertical conductors. When, in this way, the movable field 2a is shifted in the arrow direction by one winding pitch as mentioned in FIG. 6(a) and FIG. 9, the ignition signal generates 21' and 22' are both moved by one winding pitch to ignite and close the thyristor d-c switches 16-4 and 17-7, while at the same time the extinction signal generators 21'', 22'' are moved by one winding pitch to signal and open the thyristor d-c switches 16-3 and 17-6 which have been closed. Thus the movable field 2a can be held continuously in suspended propulsion. The coasting, braking and stopping of the movable field 2a can be executed in the same way as described in FIG. 6, i.e., by displacing the ignition signal and extinction signal generators 21' and 21'' and, 22' and 22'' respectively in the travelling direction of the movable field or in reverse direction to it.

The effect of the present invention has been verified by various experiments carried out by the present inventor. Some of the experimental results are cited hereafter.

EXPERIMENT

A. Condition
  1. Fixed armature windings
  Current loops of rectangular shape as shown in FIG. 6 were used, number of split units, dimensions and magnitude of current employed as follows:
  1. Two split units were used, one unit being 6.5 cm high, 18.0 cm long with 21 turns.
  2. The magnitude of current passed was 145 Amp.
  These fixed armature windings were, as shown in FIG. 6, laid in two rows continuously over a length of 10 m with a distnace of 21 cm between rows.
  2. Movable magnetic fields

| | |
|---|---|
| Height per unit | 9cm |
| Width | 26cm |
| Travel direction length | 72cm |
| Distance between ends | 18mm |
| Height of end | 2cm |
| Excitation amper turns | 28,000AT |
| Magnetic flux density | 0.72wb/m² |

Two such movable fields were mechanically coupled with a gap of 30cm in the travel direction, they weighed 220Kg including the underframe.

Figure 12:
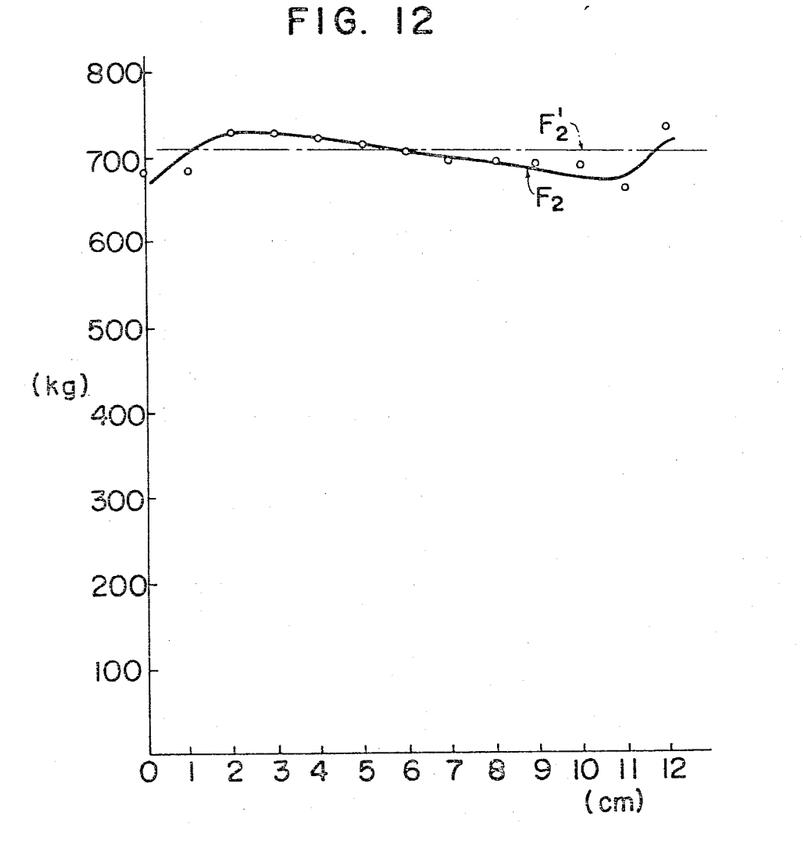
FIG. 12 shows the lift characteristics.
Figure 13:
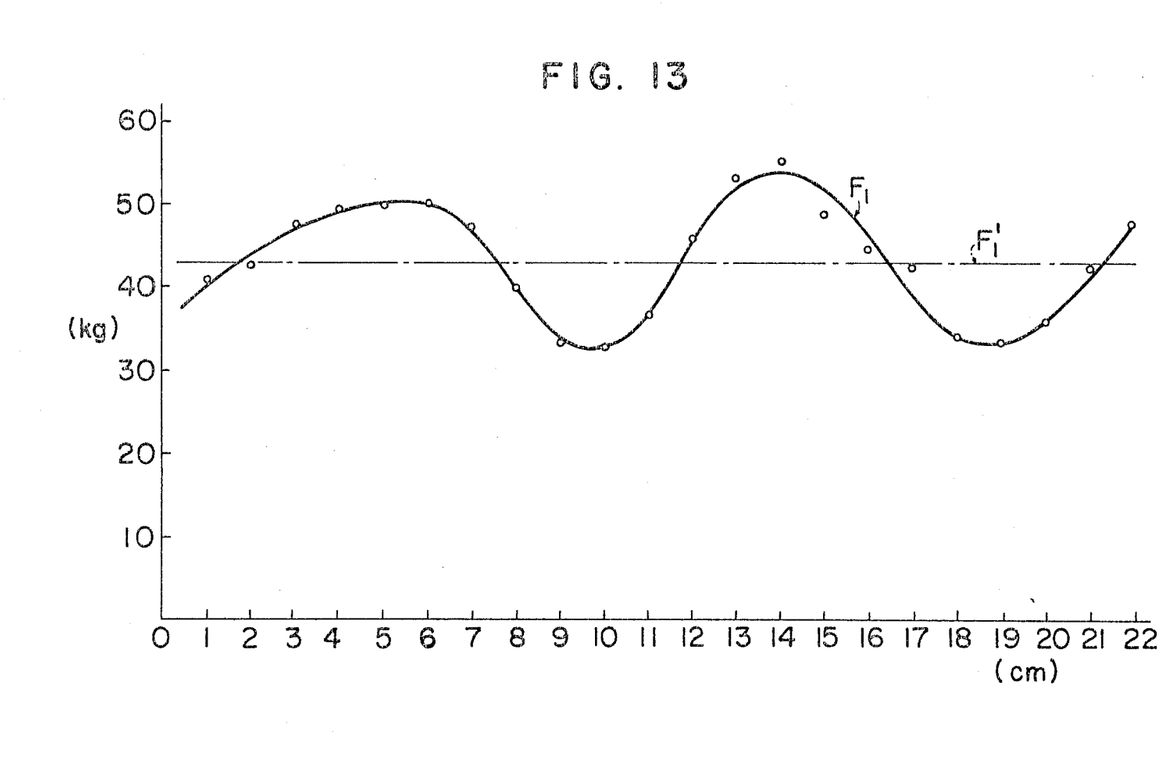
FIG. 13 shows the drive characteristics.

B. Results
The results as shown in FIGS. 12 and 13 were obtained. FIG. 12 illustrates the lift characteristics as gained in the present experiment, the abscissa indicating the travel position of the fixed armature winding, with the position of the current-collecting roller initially contacting a current-collecting plate taken as zero, and the ordinate indicating the lift acting on the total weight of the two movable fields including the underframe. In the present experiment the resulting lift curve is shown as $F_2$. From this, the average $F'_2$ (per conductor pitch of 9 cm) can be estimated at 715 Kg. Accordingly, the net average lift becomes 715 Kg −220 Kg (tare) = 495 Kg.

FIG. 13 illustrates the abscissa indicating the same thing as FIG. 12 and the ordinate indicating tthe instant drive characteristics under the load condition that the total weight including the tare (220 Kg) of the movable field is equal to one-half of the average lift 715 Kg. From the present experiment a drive curve as indicated by $F_1$ was obtained. Curve $F_1$ represents the average drive per conductor pitch of 9 cm. The average drive was found to equal to 43.3 Kg.

Pulsations are observed in the curves $F_1$, $F_2$ of FIG. 12, 13, but according to the results of many suspended operation test carrying two passengers, the frequency of the pulsation was so high that no vibration was felt by the human body. These experiments demonstrate that the present invention offers an excellent, both economically and technically, suspended propulsion system for high speed transportation on land.

As evident from the above, this invention makes it possible to realize at the same time the suspension and propulsion of a movable field, using a conventional power supply, by supplying d-c successively to the fixed armature windings in the relationship illustrated in FIG. 7.

This invention is free from the drawbacks of the conventional linear-motorized system, because it provides an efficiency of suspended propulsion sufficient for use with a conventional power supply. Meanwhile, it is free from the noise in propulsion such as generated by the proposed jet-propulsion system.

Moreover, it is a revolutionally invention, because it needs no separate installations for suspension and propulsion such as required for the proposed magnetic suspension or air-cushion system.

More specifically, the advantages of this invention are as follows:

1. When the movable field in suspended propulsion is about to deviate vertically, as seen from FIG. 4, for instance, the magnetic flux of the movable field 2a cuts across the horizontal conductor 1a', of the fixed armature winding. The conductor then opposes the movable field and thereby a dumper effect is caused by an increased and decreased current developing in the fixed armature winding in the direction of preventing said deviation of the movable field 2a.

2. By adoption of multi-split fixed armature winding as illustrated in FIGS. 8(a) and (b), the pulsations of drive and lift are minimized and inductance of the fixed armature winding is minimized, thereby facilitating the switching of the fixed armature windings by the current-collecting mechanism.

3. By adoption of the contactless current-collecting mechanism as illustrated in FIGS. 10 and 11, the current collection for a very high speed propulsion is extremely improved.

What is claimed is:
1. An apparatus for propelling an overland movable body at a very high speed in a suspended state under the influence of a magnetic flux comprising:
  a. fixed armature windings which consist of rectangular current loops, having vertical and horizontal conductors, aligned continuously along the path of travel of said movable body, moving direction, b. movable magnetic fields affixed to the underside of said movable body and disposed so that the magnetic flux generated is perpendicular to said current loops of said fixed armature windings and cuts across said vertical and horizontal conductors of said fixed armature windings; and c. a current-collecting means, which supplies and ceases to supply the d-c to adjacent fixed armature winding continuously with the shift of said movable magnetic fields, a relative lift being developed between said horizontal conductors of said fixed armature windings and said movable magnetic fields and at the same time a relative drive being developed between said vertical conductors of said fixed armature windings and said movable magnetic fields, thereby causing the movable body to be suspended and propelled along said path.

2. An apparatus as claimed in claim 1 wherein a plurality of said fixed armature windings with the same shape and dimensions are aligned superposed with a stagger equal to one division of the current loop length in the moving direction divided by an integer.

3. An apparatus as claimed in claim 1 which further includes slide-shoes for supporting said movable body when the same is not in motion.

4. An apparatus as claimed in claim 1 which further comprises power supply means for said fixed armature windings including:

a. d-c supply means connected to a plus bus bar and a minus bus bar disposed along said fixed armature windings;

b. thyristor d-c switches inserted between the connecting wires of respective fixed armature windings and the plus and minus bus bars; and c. ignition signal generators and extinction signal generators displacably mounted along the path of travel of said movable body at specified gaps on both sides thereof, said generators issuing an ignition or extinction signal to said thyristor d-c switches to supply or cut-off the supply of d-c to the adjacent fixed armature windings being effected with the progress of the movable body.

5. An apparatus as claimed in claim 1 further comprising:

connecting wires, each joining consecutive fixed armature windings, current-collecting means, each attached to each of said connecting wires, plus and minus bus bars disposed continuously along said path of travel adjustably attached to said movable body adapted to electrically short consecutive current-collecting means and said plus and minus bus bars, and d.c. supply means connected to said plus and minus bus bars for supplying d.c. to said fixed armature windings, whereby said fixed armature windings can be consecutively energized along the path of travel of said movable body to effect the motion thereof.

6. An apparatus as claimed in claim 4 wherein consecutive current-collecting means are joined by a high resistance to prevent sparking.

7. An apparatus as claimed in claim 4 wherein said shorting means is a conductive roller whose position with respect to said movable body is determined by a threaded engagement means.

8. An apparatus as claimed in claim 5 wherein means are provided for retarding the forward motion of said movable body by advancing said threaded engagement means to move said conductive roller in a direction opposite to that of travel.

9. an apparatus as claimed in claim 5 wherein said plus and minus bus bars are located between two parallel rows of said fixed armature windings.

10. A linear motor for propelling a vehicle overland in a suspended state at a very high speed comprised of magnetic poles arranged on the bottom side of the vehicle, said magnetic poles acting in combination with fixed armature windings, which are located in a continuous manner along the path of travel of said vehicle in the direction of motion and which are connected synchronously with the shifting of the magnetic poles to a stationary d-c source by means of switching devices controlled from said vehicle and which are disconnected from the same source, whereby not only a relative lift but alos a relative propulsion is simultaneously generated in the direction of motion between the fixed armature windings and the magnetic poles fixed to the vehicle, and further characterized in that the armature windings consist of vertically arranged rectangular current loops connected in series and which are permeated by the flux of the megnetic poles fixed to the vehicle in a rectangular relationship relative to the current loop plane and in such a way that the force generated by the horizontal parts of the current effect the lift in connection with the magnetic pole flux, and the forces generated by the vertical parts of the current loop cause propulsion in the direction of travel.

11. A linear motor according to claim 10, characterized in that the armature windings are arranged overlapping each other according to the type of known d-c lap windings.

12. A linear motor according to claim 10, characterized by thyristor d-c switches arranged between the armature windings and the fixed d-c source, the ignition pulse furnished by ignition generators with extinction signal generators movably arranged in the direction of travel of the vehicle.

13. A linear motor according to claim 10, characterized in that continuous bus bars are assigned to both poles of the d-c source parallel to the path of travel of the vehicle, and in that two more bus bars subdivided into a series of sections extend parallel to the first bus bars, the ends of one of the armature windings connected to said sections of the second bus bars, and in that the continuous bus bars can be connected with the sections of one of the subdivided bus bars each by short-circuiting devices fixed to the vehicle and adjustable in the direction of travel.

14. A linear motor according to claim 13, characterized in that the short-circuiting devices are conductive rollers.

15. A linear motor according to claim 13, characterized in that high-impedance resistors are switched parallel to the armature windings.

16. A linear motor according to claim 13, characterized in that the bus bars are located between two parallel rows of the fixed armature windings.

* * * * *